(12) United States Patent
Peloso et al.

(10) Patent No.: US 10,891,388 B2
(45) Date of Patent: Jan. 12, 2021

(54) PERSONALIZED ACCESS TO STORAGE DEVICE THROUGH A NETWORK

(71) Applicant: Alcatel Lucent, Boulogne-Billancourt (FR)

(72) Inventors: Pierre Peloso, Nozay (FR); Nicolas Le Sauze, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 15/562,449

(22) PCT Filed: Apr. 1, 2016

(86) PCT No.: PCT/EP2016/057251
§ 371 (c)(1),
(2) Date: Sep. 28, 2017

(87) PCT Pub. No.: WO2016/165961
PCT Pub. Date: Oct. 20, 2016

(65) Prior Publication Data
US 2018/0089456 A1 Mar. 29, 2018

(30) Foreign Application Priority Data
Apr. 16, 2015 (EP) .................................... 15305571

(51) Int. Cl.
*G06F 21/62* (2013.01)
*H04W 12/08* (2009.01)
(Continued)

(52) U.S. Cl.
CPC .......... *G06F 21/6218* (2013.01); *G06F 3/067* (2013.01); *H04L 12/28* (2013.01);
(Continued)

(58) Field of Classification Search
CPC . H04W 84/12; H04L 67/1097; H04L 61/2061
See application file for complete search history.

(56) References Cited

U.S. PATENT DOCUMENTS 7,353,533 B2 * 4/2008 Wright .................... G06F 21/32
 379/15.03
2004/0123150 A1 * 6/2004 Wright .................... G06F 21/32
 726/1
(Continued)

FOREIGN PATENT DOCUMENTS

JP JH11234315 8/1999
JP 2003110570 4/2003
(Continued)

OTHER PUBLICATIONS

IEEE Computer Society: IEEE STD 802.11-2012: Part 11: Wireless LAN Medium Access Control (MAC) and Physical Layer (PHY) Specifications; Internet Citation; Mar. 29, 2012 (Mar. 29, 2012), pp. I, 5-34, 55, 57,, XP002731582; Retrieved from the internet: URL:http://ieeexplore.ieee.org/stamp/stamp.jsp?tp=&arnumber=6178212; [retrieved on Oct. 23, 2014].
(Continued)

*Primary Examiner* — Madhuri R Herzog
(74) *Attorney, Agent, or Firm* — McCracken & Gillen LLC

(57) ABSTRACT

A technique is provided for a personalized access to a storage device from a communication device through a local network, with public data and private data being stored in the storage device. The storage device is configured to retrieve an identifier of the local network, allow access to the public data and a set of private data if the retrieved identifier is included in a first list of local networks, and deny access to the set of private data if the retrieved identifier is not included in the first list of the local networks.

19 Claims, 1 Drawing Sheet

(51) Int. Cl.
  *H04L 29/08* (2006.01)
  *H04L 12/28* (2006.01)
  *H04W 12/00* (2009.01)
  *G06F 3/06* (2006.01)
  *H04L 29/12* (2006.01)
  *H04W 84/12* (2009.01)
  *H04L 29/06* (2006.01)

(52) U.S. Cl.
  CPC ...... *H04L 61/2061* (2013.01); *H04L 67/1097* (2013.01); *H04W 12/08* (2013.01); *H04L 63/101* (2013.01); *H04L 63/102* (2013.01); *H04W 12/00516* (2019.01); *H04W 84/12* (2013.01)

(56) References Cited

U.S. PATENT DOCUMENTS

| | | | | |
|---|---|---|---|---|
| 2006/0072760 | A1* | 4/2006 | Gates | H04L 63/10 380/270 |
| 2007/0073868 | A1* | 3/2007 | Nelson | H04L 63/0823 709/224 |
| 2007/0178933 | A1* | 8/2007 | Nelson | H04W 48/18 455/550.1 |
| 2009/0037469 | A1* | 2/2009 | Kirsch | G06Q 10/107 |
| 2010/0136968 | A1* | 6/2010 | Srivastava | H04W 48/16 455/434 |
| 2011/0035787 | A1* | 2/2011 | Naslund | H04L 63/08 726/3 |
| 2012/0003958 | A1* | 1/2012 | Hossain | H04W 12/06 455/411 |
| 2012/0047269 | A1 | 2/2012 | Leonov et al. | |
| 2012/0284779 | A1 | 11/2012 | Ingrassia, Jr. et al. | |
| 2015/0024747 | A1 | 1/2015 | Wohlert | |
| 2015/0135021 | A1* | 5/2015 | Robison | G06F 21/6263 714/55 |
| 2015/0135270 | A1* | 5/2015 | Robison | G06F 21/30 726/4 |

FOREIGN PATENT DOCUMENTS

| | | |
|---|---|---|
| JP | 2009129010 | 6/2009 |
| JP | WO2012035644 | 1/2014 |
| JP | WO2013132784 | 7/2015 |

OTHER PUBLICATIONS

Droms, R.; RFC 2131—Dynamic Host Configuration Protocol (DHCP); Internet Citation, Mar. 1997 (Mar. 1997); XP002193184; Retrieved from internet: URL:http://www.ietf.org/rfc/rfc2131.txt; [retrieved on Mar. 14, 2002].

UPnP(TM) Device Architecture 1.1; Internet Citation; Oct. 15, 2008 (Oct. 15, 2008); XP055143319; whole document.

* cited by examiner

… (1)

PERSONALIZED ACCESS TO STORAGE DEVICE THROUGH A NETWORK

FIELD OF THE INVENTION

The present invention pertains to the management of access to a storage device through a network, in order to access data stored in the storage device.

BACKGROUND

Portable storage devices of type hard disks are per definition following users and are likely to be shared with other users. For example, a user may move with a storage device that is usually plugged in a home Local Area Network (LAN), and may want to plug it in one of a friends' home network in order to show photos. However, the visiting user should check all other material on the storage device and possibly remove the critical pieces before plugging it in its friend's network.

Currently, there is no solution to have an automated check on the storage device disk so that the user does not have to care about what is stored in the storage device when connecting it to a local network.

SUMMARY

This summary is provided to introduce concepts related to the present inventive subject matter. This summary is not intended to identify essential features of the claimed subject matter nor is it intended for use in determining or limiting the scope of the claimed subject matter.

In accordance with one embodiment, a method is provided for a personalized access to a storage device from a communication device through a local network, the method comprising the following steps:
retrieving an identifier of the local network,
allowing access to public data and a set of private data stored in the storage device if the retrieved identifier is included in a list of local networks,
denying access to said set of private data if the retrieved identifier is not included in said list of local networks.

Advantageously, when the storage device is connected to the local network of the user (or any "friendly" network), the user can see all the content of the storage device, but when the storage device is connected to a "foreign" network, only the public part of the content can be accessed. The automatic access to private or public data in the storage device promotes the use and the share of the storage device in any circumstances.

The solution improves personalization capabilities of all portable storage devices, making them friendlier to use and share.

In an embodiment, the identifier of the local network is detected automatically by the storage device once the storage device is connected to the local network.

In an embodiment, the identifier of the local network is included in a message sent from an entity managing the local network.

In an embodiment, the local network is a wireless network and said identifier of the local network is the Service Set Identifier (SSID) of the wireless local network broadcasted by the hot spot of the wireless local network.

In an embodiment, the message is sent in response to a request from the storage device.

In an embodiment, the message is sent from a Dynamic Host Configuration Protocol server managing the local network and comprises an identifier of the Dynamic Host Configuration Protocol server.

In an embodiment, the identifier of the local network further contains the MAC address of the entity managing the local network.

In an embodiment, the identifier of the local network is associated with identifiers of devices connected to the local network, said identifiers of devices being detected inside Universal Plug and Play (UPnP) protocol messages and stored in correspondence with the identifier of the local network.

In an embodiment, when the storage device is connected to another local network, the identifier of said another local network is set in a list of friendly local networks if detected identifiers of devices connected to said another network correspond at least partially to stored identifiers associated with an identifier of a local network included in one list of friendly local networks.

In an embodiment, different sets of private data are respectively associated with different lists of local networks.

In an embodiment, another local network is allowed access to public data and another set of private data stored in the storage device if the retrieved identifier of said another local network is included in another list of local networks.

In an embodiment, it is allowed access to only public data if the identifier of a local network is not included in any list of local networks.

The invention relates also to a device for storage device for a personalized access to the storage device from a communication device through a local network, the storage device being configured to:
retrieve an identifier of the local network,
allow access to public data and a set of private data stored in the storage device if the retrieved identifier is included in a list of local networks,
deny access to private data if the retrieved identifier is not included in said first list of local networks.

The invention also pertains to a computer program capable of being implemented within a device, said program comprising instructions which, when the program is executed within said device, carry out steps according to the inventive method.

BRIEF DESCRIPTION OF DRAWINGS

The present invention and the benefits thereof shall be better understood upon examining the description below, which makes reference to the attached figures, in which.

DETAILED DESCRIPTION

Figure 1:
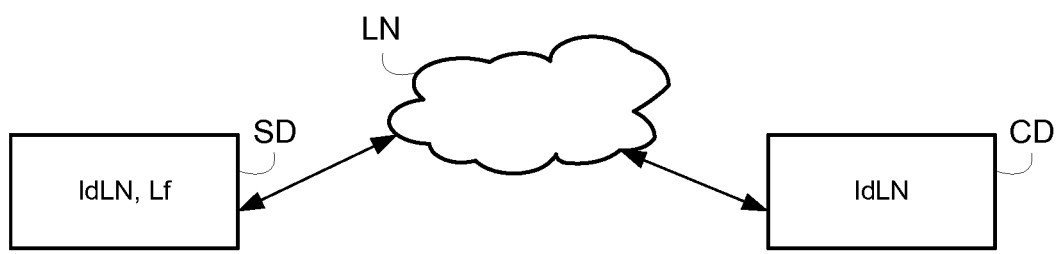
FIG. 1 is a schematic block diagram of a communication system according to one embodiment of the invention for a personalized access to a storage device through a network.

With reference to FIG. 1, a communication system according to the invention comprises a storage device SD and a communication device CD.

The communication device CD is capable of connecting with the storage device SD through a local network LN via a wired or wireless connection, in order to access to the content stored in the storage device.

The communication device CD can be a personal computer or a laptop, a tablet, a smart phone, a personal digital assistant, a set-top box, a residential gateway, a game console or a connected television, for instance. More generally it concerns any type of electronic equipment comprising a communication module, capable of establishing connection with the storage device SD to exchange data such as messages with the storage device.

The storage device SD may store different kinds of files, and differentiate private data and public data. To this end, the storage device SD may use two distinct folders, one for each type of information, with the possibility of having inner subfolders. In other embodiments, a public or private part can be defined by the file system features (e.g. Ext3)

The storage device SD may also ask the user if data are for public or private usage and keep the information given by the user in metadata of the stored data.

The storage device SD may display the private data in different ways when connected to a communication device that is unknown or declared non friendly, like a public computer. Private data can either be hidden or appear as being encrypted files or folders, with a possibility to be accessed with correct credentials.

The storage device SD may be of different natures.

It is assumed that the storage device SD and the communication device CD are connected through a local network via a wired or wireless connection.

In an embodiment, the storage device SD is connected to the local network via a wireless link such as Wifi or via a wired link such as Ethernet.

In one example, the storage device SD is a hard drive to be connected to a local area network.

In another example, the storage device SD is a personal computer, a laptop, a tablet or a smart phone.

In another example, the storage device SD is a connected object such as an advertisement board, a television set, a household appliance, a communication terminal, a fridge, a camera. A connected object comprises a network interface that is part of a data processing unit that may be directly embedded in the connected object.

In one embodiment, the storage device SD implements an application that determines an identifier IdLN of the local network to which the storage device is connected.

In one embodiment, the identifier IdLN of the local network is the Service Set Identifier SSID of a wireless local network. Furthermore, as the SSID is not unique, the identifier IdLN of the local network can contain the MAC (media access control) address of the wireless local network hot spot. The identifier SSID can be easily retrieved as it is broadcasted by the hot spot.

In another embodiment, the identifier IdLN of the local network is an identifier of a Dynamic Host Configuration Protocol (DHCP) server. When the storage device is connected to the local network via Ethernet or WiFi, the storage device can detect the DHCP server that provided the IP address to the storage device when plugging it in the local network. Messages exchanged with the DHCP server may include a field with a unique DHCP server identifier allowing to clearly identify to which local network the storage device is connected.

In another embodiment, the identifier IdLN is set by the application after that this latter has detected devices connected to the local network and has retrieved identification data from these detected devices. For example, the application uses the Universal Plug and Play (UPnP) protocol to retrieve identifiers of devices, such as MAC address of the devices, or their serial number. The first time the storage device is connected to a local network, the identifier of the local network is put in a list of friendly local networks and is associated with identifiers of devices connected to the local network. The identifier of the local network is thus stored in correspondence with identifiers of devices connected to the local network.

In a general manner, when the storage device is connected again to a given local network, the application retrieves identifiers of devices connected to said given local network and compares the retrieved identifiers with the stored identifiers associated with the identifier(s) of the local network(s) included in the list(s) of friendly local networks. If the retrieved identifiers match, at least partially, the stored identifiers associated with the identifier of a local network included in a list of friendly local networks, the application defines an identifier IdLN for the given local network and put it in a list of friendly local networks. In a specific example, at least half of the retrieved identifiers should correspond to stored identifiers associated with the identifier of a local network included in a list of friendly local networks in order to consider that the local network is "friendly. For example, the identifier IdLN is a name for the local network automatically defined by the application or entered by the user.

If the identifier IdLN of the local network is known and declared friendly, private data and all the public in the storage device can be accessed from a communication device through the local network.

If the identifier IdLN of the local network is unknown or declared non friendly, only the public data in the storage device can be accessed from a communication device connected to the local network.

The application manages at least one list Lf of friendly local networks from which data stored in the storage device are accessible, both private and public data. The list can be modified manually by the user through a dedicated management interface requiring credentials or without credentials if the storage device is connected to a friendly communication device. A local network is considered as friendly if its identifier is included in a list Lf of friendly local networks.

The application can manage several lists of friendly local networks, each list allowing access to public data and a set of private data. Thus different sets of private data are respectively associated with different lists of local networks. In one embodiment, an identifier of a local network cannot be included in more than one list. In one embodiment, there is one list of local networks that gives access to all the public and private data. The association of lists with sets of private data may be initially done by the developer of the application or may be modified by the user through a dedicated management interface.

The first time the storage device is connected to a local network, the identifier of the local network is learnt by the application. The identifier is put in a list of friendly local networks to grant full access to data stored in the storage device. Per default, it is assumed the first use of the storage device is done with a friendly local network. The application in the storage device allows to add new identifiers to the list of friendly local networks. Per default, it is assumed that another local network is considered non friendly the first time the storage device is connected to.

In one example, the identifier IdLN can be associated with a given profile only via a friendly local network, such as the home network of the user, requiring or not a password from the user.

In another example, the identifier IdLN can be associated with a given profile via any communication device, requiring a password from the user.

In one embodiment according to which the identifier IdLN is a Service Set Identifier SSID of a wireless local network, when a new identifier IdLN is detected, the application ask the user whether the local network corresponding to the new detected identifier IdLN should be added to the list of friendly local networks, with a password required from the user. To avoid inviting user to declare if the local network is friendly each time the storage device is connected to a non-friendly local network, a list of non-friendly local network can also be stored in the storage device. Thus only the very first time a new identifier IdLN is detected, the question to select the local network as friendly device is raised. If a local network initially classified as non-friendly has to be reclassified as friendly, the modification can be done by a manual addition of the identifier IdLN of the local network to the list of friendly local network. If the application manages several lists of local networks, it can ask the user in which list an identifier of local network has to be put.

Figure 2:
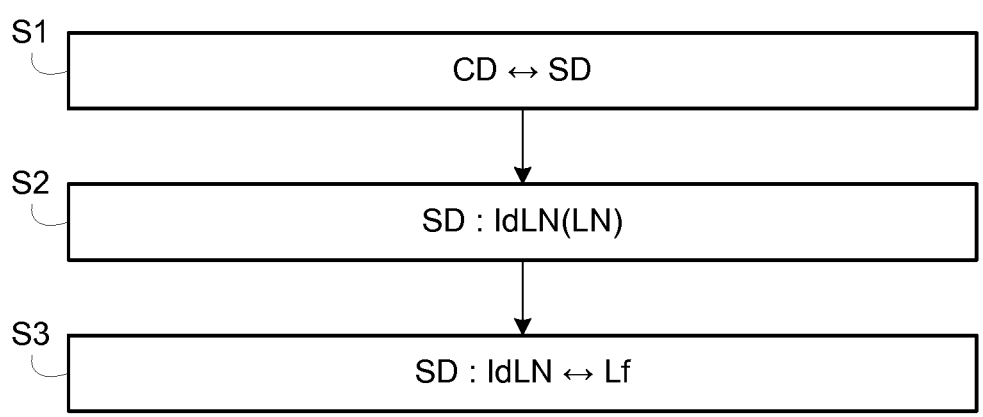
FIG. 2 is an algorithm of a method for a personalized access to a storage device through a network according to one embodiment of the invention.

With reference to FIG. 2, a method for a personalized access to a storage device through a local network according to one embodiment of the invention comprises steps S1 to S3 executed within the communication system.

In step S1, the storage device SD is connected to a local network LN. It is assumed the storage device is owned by a given user, the local network may be owned by the user or not.

In step S2, the application in the storage device retrieves an identifier IdLN of the local network. In one embodiment, the identifier is unique and uniquely identifies the local network. For example, the identifier is a Service Set Identifier SSID of a wireless local network.

The identifier IdLN is retrieved automatically by the application by an automatic detection of the identifier once the storage device is connected to the local network. The identifier is included in a message sent from an entity managing the local network, possibly in response to a request from the storage device. For example, said entity is a wireless hot spot or a DHCP server.

In one embodiment, the identifier of the local network further contains the MAC address of the entity managing the local network.

Alternatively, the identifier is deduced from messages sent from other devices connected to the local network allowing to identify these machines, e.g. via Universal Plug and Play (UPnP) protocol messages.

In step S3, the application in the storage device allows access to public data and a set of private data if the identifier of the local network is included in a list Lf of friendly local networks, and denies access to private data if the identifier of the local network is not included in the list Lf of friendly local networks.

In one embodiment, different sets of private data are respectively associated with different lists Lf of local networks. In one example, a list Lf of local networks does not have any identifier in common with another list of local networks. More generally, the association of lists with sets of private data may be initially done by the developer of the application or may be modified by the user through a dedicated management interface.

If the storage device is connected to another local network, if the retrieved identifier of said another local network is included in another list Lf of local networks, it is allowed access to public data and to another set of private data.

In one example, there are two lists associated with different set of data and three home local networks owned by Alice, Bob and Sam. The identifier of the local network of Alice is included in the list number one and it is allowed access to public data A, public data B, private data C and private data D through this local network. The identifier of the local network of Bob is included in the list number two and it is allowed access to public data A, public data B, private data D and private data E. The identifier of the local network of Sam is not included in any list and it is allowed access only to public data A and public data B.

The invention described here relates to a method and a device for a personalized access to a storage device through a local network. According to one implementation of the invention, the steps of the invention are determined by the instructions of a computer program incorporated into the device, such as the storage device SD. The program comprises program instructions which, when said program is loaded and executed within the device, carry out the steps of the inventive method.

Consequently, the invention also applies to a computer program, particularly a computer program on or within an information medium, suitable to implement the invention. This program may use any programming language, and be in the form of source code, object code, or intermediate code between source code and object code, such as in a partially compiled form, or in any other form desirable for implementing the inventive method.

The invention claimed is:

1. A method, comprising:
   detecting automatically, by a storage device, an identifier of a local network once the storage device is connected to the local network, wherein in a condition of the storage device being connected a first time to the local network, the identifier of the local network is put in a list of local networks and is associated with identifiers of devices connected to the local network;
   establishing, at the storage device, a connection with a communication device connected to the local network;
   retrieving, by the storage device, the identifier of the local network;
   in a condition of the retrieved identifier of the local network being included in the list of local networks, allowing, by the storage device, the communication device to have access to public data and a set of private data stored in the storage device;
   in a condition of the retrieved identifier of the local network not being included in the list of local networks, denying, by the storage device, the communication device to have access to the set of private data; and
   in a condition of reclassifying another local network initially classified as non-friendly and stored in a list of non-friendly local networks, requesting, at the storage device, an addition of the another local network's identifier to the list of local networks.

2. The method according to claim 1, wherein the identifier of the local network is included in a message sent from an entity managing the local network.

3. The method according to claim 2, wherein the local network is a wireless network and the identifier of the local network is a Service Set Identifier (SSID) of the wireless local network broadcasted by a hot spot of the wireless local network.

4. The method according to claim 2, wherein the message is sent in response to a request from the storage device.

5. The method according to claim 4, wherein the message is sent from a Dynamic Host Configuration Protocol server managing the local network and comprises an identifier of the Dynamic Host Configuration Protocol server.

6. The method according to claim 2, wherein the identifier of the local network further contains a media access control (MAC) address of the entity managing the local network.

7. The method according to claim 1, wherein the identifier of the local network is associated with the identifiers of devices connected to the local network, the identifiers of the devices being detected via a Universal Plug and Play protocol and stored in correspondence with the identifier of the local network.

8. The method according to claim 7, wherein, when the storage device is connected to another local network, the identifier of the another local network is set in a list of friendly local networks if detected identifiers of devices connected to the another network correspond at least partially to stored identifiers associated with an identifier of a local network included in one list of friendly local networks.

9. The method according to claim 1, wherein different sets of private data are respectively associated with different lists of local networks.

10. The method according to claim 9, wherein another local network is allowed access to the public data and another set of private data stored in the storage device if the retrieved identifier of the another local network is included in another list of local networks.

11. The method according to claim 1, wherein access is allowed to only the public data if the identifier of the local network is not included in any list of local networks.

12. The method according to claim 1, wherein the identifier of the local network is automatically added to one list of local networks to grant full access to data stored in the storage device through the local network, if the local network is the first local network to which the storage device is connected.

13. A non-transitory information medium storing computer executable instructions for performing steps, comprising:
    detecting automatically an identifier of a local network once a storage device is connected to the local network, wherein in a condition of the storage device being connected a first time to the local network, the identifier of the local network is put in a list of local networks and is associated with identifiers of devices connected to the local network;
    establishing a connection with a communication device connected to the local network;
    retrieving the identifier of the local network;
    in a condition of the retrieved identifier of the local network being included in the list of local networks, allowing, by the storage device, the communication device to have access to public data and a set of private data stored in the storage device;
    in a condition of the retrieved identifier of the local network not being included in the list of local networks, denying, by the storage device, the communication device to have access to the set of private data; and
    in a condition of reclassifying another local network initially classified as non-friendly and stored in a list of non-friendly local networks, requesting, at the storage device, an addition of the another local network's identifier to the list of local networks.

14. A communication system, comprising:
    a local network configured for wired or wireless connections to devices;
    a storage device configured to connect to the local network; and
    a communication device configured to establish a connection with the storage device via the local network to access content stored in the storage device;
    wherein the storage device is further configured to:
        detect automatically an identifier of the local network once the storage device is connected to the local network, wherein in a condition of the storage device being connected a first time to the local network, the identifier of the local network is put in a list of local networks and is associated with identifiers of devices connected to the local network;
        retrieve the identifier of the local network;
        in a condition of the retrieved identifier of the local network being included in the list of local networks, allow the communication device to have access to public data and a set of private data stored in the storage device;
        in a condition of the retrieved identifier of the local network not being included in the list of local networks, deny the communication device access to the set of private data; and
        in a condition of a reclassification of another local network initially classified as non-friendly and stored in a list of non-friendly local networks, request an addition of the another local network's identifier to the list of local networks.

15. The method according to claim 1, wherein the public data and the set of private data are contained in distinct folders or in metadata of the stored data.

16. The method according to claim 1, wherein the list of local networks is modifiable by a user.

17. The method according to claim 1, wherein the storage device connects to the local network via a wireless link based on IEEE 802.11 standards.

18. The method according to claim 1, wherein the storage device connects to the local network via an Ethernet link.

19. The method according to claim 1, wherein the identifier is retrieved automatically by the automatic detection of the identifier once the storage device is connected to the local network.

* * * * *